United States Patent
Fielding et al.

(10) Patent No.: US 10,516,538 B2
(45) Date of Patent: Dec. 24, 2019

(54) SYSTEM AND METHOD FOR DIGITALLY SIGNING DOCUMENTS USING BIOMETRIC DATA IN A BLOCKCHAIN OR PKI

(71) Applicant: Netcomm Inc., Rockville, MD (US)

(72) Inventors: Laurel Fielding, McLean, VA (US); Tewodros Mulatu, Silver Spring, MD (US)

(73) Assignee: NETCOMM INC., Rockville, MD (US)

( * ) Notice: Subject to any disclaimer, the term of this patent is extended or adjusted under 35 U.S.C. 154(b) by 210 days.

(21) Appl. No.: 15/801,184

(22) Filed: Nov. 1, 2017

(65) Prior Publication Data

US 2018/0152297 A1 May 31, 2018

Related U.S. Application Data

(60) Provisional application No. 62/416,001, filed on Nov. 1, 2016.

(51) Int. Cl.
*H04L 9/32* (2006.01)
*H04L 9/00* (2006.01)
(Continued)

(52) U.S. Cl.
CPC .......... *H04L 9/3231* (2013.01); *H04L 9/006* (2013.01); *H04L 9/0866* (2013.01); *H04L 9/30* (2013.01);
(Continued)

(58) Field of Classification Search
CPC ... H04L 9/3231; H04L 9/3297; H04L 9/3236; H04L 9/0866; H04L 9/30; H04L 9/006; H04L 9/3226; H04L 2209/38; G06Q 50/18
See application file for complete search history.

(56) References Cited

U.S. PATENT DOCUMENTS 7,188,362 B2   3/2007   Brandys
7,481,364 B2   1/2009   Cannon et al.
(Continued)

OTHER PUBLICATIONS

Cernian et al., "The design and implementation of an experimental model for secure management of personal data based on electronic identity card and PKI infrastructure", IFAC Proceedings Volumes, vol. 45, Issue 6, May 23-25, 2012, pp. 1697-1701.
(Continued)

*Primary Examiner* — Huan V Doan
(74) *Attorney, Agent, or Firm* — Vector IP Law Group LLC; Robert S. Babayi

(57) ABSTRACT

A system and method executed in one or more servers that interface with a Database Management System (DBMS) for signing and exchanging documents electronically with or without a PIV. If a PIV card is used, a card reader reads embedded private biometric key stored on the card and sends the private key to a node that has the corresponding public key on the X.509 certificate. The public key is derived from the private biometric key embedded in the PIV card as described above. Information contained in X.509 certificate is used to authenticate a user for example using the SSH protocol. If a PIV card is not used, the biometric data represents captured biometric data blocks, which are used to generate a biometric hash at a subscriber node. The subscriber node sends the biometric hash to a plurality of observer nodes that validate the hash by sending validation responses based on hash ledgers states at each observer node. If most of the observer nodes validate the biometric hash, the subscriber is authenticated for signing documents under any role a subscriber may have in an organization.

6 Claims, 15 Drawing Sheets

(51) Int. Cl.
*H04L 9/30* (2006.01)
*H04L 9/08* (2006.01)
*H04L 9/06* (2006.01)
*G06Q 50/18* (2012.01)
*H04L 9/14* (2006.01)

(52) U.S. Cl.
CPC .......... *H04L 9/3236* (2013.01); *H04L 9/3239* (2013.01); *H04L 9/3297* (2013.01); *G06Q 50/18* (2013.01); *H04L 9/0637* (2013.01); *H04L 9/14* (2013.01); *H04L 9/3226* (2013.01); *H04L 9/3247* (2013.01); *H04L 9/3263* (2013.01); *H04L 2209/38* (2013.01)

(56) References Cited

U.S. PATENT DOCUMENTS

| | | | |
|---|---|---|---|
| 7,818,255 | B2 | 10/2010 | Pandya et al. |
| 7,870,998 | B2 | 1/2011 | Chase-Salerno et al. |
| 8,370,632 | B2 | 2/2013 | Lehwany |
| 8,775,809 | B2 | 7/2014 | Tuyls et al. |
| 8,775,814 | B2 | 7/2014 | Bidare |
| 8,990,572 | B2 | 3/2015 | Patefield-Smith et al. |
| 9,037,851 | B2* | 5/2015 | Choi ............ G06F 21/32 713/159 |
| 9,323,914 | B1 | 4/2016 | Wieland |
| 9,495,546 | B2 | 11/2016 | Marien |
| 9,589,260 | B2 | 3/2017 | Choi |
| 2002/0176583 | A1 | 11/2002 | Buttiker |
| 2004/0059924 | A1 | 3/2004 | Soto et al. |
| 2005/0229006 | A1 | 10/2005 | De Moura et al. |
| 2013/0251214 | A1* | 9/2013 | Chung ............ G06Q 50/265 382/116 |
| 2015/0143511 | A1 | 5/2015 | Vujic et al. |
| 2018/0308098 | A1* | 10/2018 | Ebrahimi ......... H04L 9/3066 |
| 2019/0013931 | A1* | 1/2019 | Benini ............ H04L 9/006 |

OTHER PUBLICATIONS

Barman et al., "A novel secure key-exchange protocol using biometrics of the sender and receiver", Computers & Electrical Engineering, Nov. 21, 2016.

* cited by examiner

SYSTEM AND METHOD FOR DIGITALLY SIGNING DOCUMENTS USING BIOMETRIC DATA IN A BLOCKCHAIN OR PKI

CROSS-REFERENCE TO RELATED APPLICATIONS

This Non-Provisional Application claims the benefit of U.S. Provisional Application No. 62/416,001 filed Nov. 1, 2016 by Fielding et al., titled "System and Method For Digitally Signing Documents Using Personal Identity Verification or Common Access Cards and PKI Keys".

FIELD OF THE INVENTION

This invention generally relates to a system and method that enables a user or subscriber to digitally sign any electronic document and send it to another user or subscriber who, in one example, can be a counterparty to an agreement with the signing user.

BACKGROUND OF THE INVENTION

A legal digital signature is comprised of a digital signature hash validated against an organization's authentication infrastructure. This type of signature provides the same legal standing as a handwritten signature if it adheres to the requirements of the specific regulation it was created under (e.g., eIDAS in the European Union, NIST-DSS in the USA or ZertES in Switzerland). Digital signatures are used in e-commerce and in regulatory filings to implement electronic signature in a cryptographically protected way. Standardization agencies like NIST or ETSI provide standards for their implementation (e.g., NIST-DSS, XAdES or PAdES). For example, U.S. Pat. No. 9,495,546 discloses an electronic signing method.

Various point-to-point secure communication protocols provide cryptographic endpoint authentication for applications that communicate within client-server based networks for preventing eavesdropping, tampering, and message forgery during communications. SSH is a set of standards and associated network protocols that allow for establishing a secure channel between a local and a remote computer. This protocol uses public-key cryptography to authenticate the remote computer.

U.S. Pat. No. 8,990,572 discloses conducting secure smart card transactions with mobile devices. Federal Information Processing Standard Publication (FIPS) 201 is a United States federal government standard that specifies Personal Identity Verification (PIV) requirements for Federal employees and contractors. A PIV card is a card used for identity authentication and information access control. A PIV card can be a smart card, chip card, or integrated circuit card (ICC) is any pocket-sized card with or without an embedded integrated circuit. A PIV card reader is an electronic device that reads information contained in PIV cards. FIG. 1 shows a PIV card.

It is also known to apply features of biometric data to a hash generator that relies on boundaries to generate a hash, which is used to generate biometric keys. For example, FIG. 2 shows basic operation block diagram of an Iris biometric crypto system that uses a biometric template itself or a hash of the biometric as the biometric keys. FIG. 3 shows block diagram of a quantization scheme that constructs intervals for each element of a biometric feature vector shown in FIG. 2, where the biometric keys are generated by mapping the features into the intervals.

US Publication #20150143511 discloses biometric access controls. U.S. Pat. No. 7,481,364 discloses biometric identification device with smart card capabilities. U.S. Pat. No. 9,589,260 discloses authenticating electronic money using a smart card that takes biometric signature from a user as an input and transmits a recognition completion information to a communication terminal when the biometric signature inputted by the user matches a stored biometric signature. U.S. Pat. No. 9,323,914 discloses a smart card with partially or fully virtualized components that maximizes confidentiality of stored information using digitized unique biometric identifiers.

Multi-factor authentication (MFA) is a method of computer access control in which a user is granted access only after successfully presenting several separate pieces of evidence to an authentication mechanism—typically at least two of the following categories: knowledge (something they know) and possession (something they have) or a biometric parameter (something they are). Two-factor authentication (also known as 2FA) is a method of confirming a user's claimed identity by utilizing a combination of two different components. A personal identification number (PIN) are examples of something a user knows and a PIV card is something the user has. By authenticating the PIN number and information read from the PIV card, documents can be digitally signed by the user.

Various ways of placing e-signatures on documents are known. Adode's PDF documents, for example, can be e-signed by placing signature images, e.g., handwritten signatures, within documents. Docusign (https://www.docusign.com/products/electronic-signature) uses a system and method for approvals of agreements based on e-signatures. The DocuSign system can embed electronic signing into existing website, portals, and applications.

Asymmetric cryptography uses a pair of mathematically related keys known as public and private keys, which obviate the need for prior knowledge of a shared secret key amongst communicating participants in symmetric key cryptography. Public key infrastructure (PKI) is a known system for securing information using asymmetric key cryptography. In such systems, a party at one computer station digitally signs messages using a randomly created private key and a party at another computer station verifies the signature using a distributed public key derived from the private key. The public keys of the communicating participants are distributed in corresponding certificates, also known as Public Key Certificates, issued by one or more trusted parties called Certificate Authorities (CAs). PKI enables communicating parties to be authenticated to each other and to use the public key information in certificates to encrypt and decrypt messages.

By digitally signing the certificate, a central authority (CA) attests that the public key belongs to the identity, i.e., the person, organization, server, or other entity noted in the Certificate. The CA is often a trusted third party that issues digital Certificates for use by communicating parties. The requirement of trust obligates the CA to somehow verify the identity credentials of communicating parties. It is assumed that if the parties trust the CA and can verify its signature, they can also verify that a public key does indeed belong to whomever is identified in the certificate.

Applications often provide access to resources based on credentials supplied by the user. Typically, such applications verify user identity and provide access to resources based on roles. Roles are often used in financial or business applications to enforce policy. For example, an application might impose limits on who can sign documents depending on whether the signer is a member of a specified role. Role Based Access Control (RBAC) is handled via an <RBACRoles> X.509 Extensions. X.509 specifies formats for public key certificates, certificate revocation lists, attribute certificates, and a certification path validation algorithm.

U.S. Pat. No. 8,775,809 discloses biometrics based signatures in which a verifier attains a first biometric template of an individual to be verified based on a finger print. The verifier then receives a digital signature and a second biometric template and verifies the digital signature by using either the first or the second biometric template as a public key. The attained (first) biometric template is compared with the received (second) biometric template associated with the signature and if a match occurs, the verifier can be confident that the digital signature and the associated (second) biometric template have not been manipulated by an attacker for impersonation purposes. The drawback of the system is that biometric templates are used as a public key, which are shared with other nodes thereby preventing privacy of biometric data.

US Publication #20020176583 discloses a public-key infrastructure based on credentials that rely on a fingerprint that is presented to an authority of the public-key infrastructure. After reading biometric data derived from a fingerprint of a user at a biometric input device, the biometric data is signed with the private-key issued by the authority. The PKI infrastructure sends a certification request containing the public-key and the signed biometric data. After verifying and registering received data by the authority, the biometric data is sorted in a database and a corresponding certificate is returned. The certificate is stored in a token. After registration of the token, the public-key infrastructure allows signing and encrypting messages with digital signatures, on which a third party can rely on. In case of fraud biometric data taken from an unauthorized user can be stored in a database and later legally used as evidence. Therefore, it is known to use PKI certified biometric data to sign messages.

US Publication #20040059924 discloses a biometric signature system that employs biometric private keys (BioPKI) and a digital signature. The BioPKI uses a combination of biometric technology to access private keys in order to create digital signatures based on biometric authentication and industry-standard PKI technologies. BioPKI utilizes public key cryptography technology to encrypt the biometric signature information for transmission to the BioPKI server.

U.S. Pat. No. 9,037,851 discloses a user authorization system for authorization management with a public PKI certificate issuing server that issues a PKI certificate including a subscriber's biometric signature. The system also includes a sensing means that recognizes biometric patterns with a smart card that stores the subscriber's biometric signature and a PKI certificate, e.g., X.509 certificate, that verifies the user. The smart card transmits a signal to the terminal if the user's biometric pattern matches with the subscriber's biometric signature and transmits authorization information derived from the PKI certificate. The draw pack of the foregoing prior art is that the biometric data itself is not used for generating the private and public keys, which makes it susceptible to fraud if the PKI infrastructure is somehow compromised.

U.S. Pat. No. 7,188,362 discloses a smart card used to digitally sign messages by authenticating biometric data provided by a user. The smart card has a random number generator and an encryption module. In an enrollment mode, the biometric data analyzer receives biometric data from a user and triggers a random number generator to create a public key and a private key. The private key is stored in a tamper-resistant component on the smart card. The public key is transmitted to an external device, such as a computer. During a signing mode via a card reader interface, the smart card digitally signs incoming messages after verifying the user's biometric data. The draw pack of this prior art is that the biometric data itself is used for randomly generating the private and public keys, which makes it susceptible to fraud if the generator infrastructure is somehow compromised.

Blockchain technology is known. A blockchain is a continuously growing list of records, called blocks, which are linked and secured using cryptography. By design, blockchains are inherently resistant to modification of the data. A blockchain can serve as distributed ledger that can record transactions between two parties efficiently and in a verifiable and permanent way. FIG. 4 shows a flow diagram of blockchain for when a user sends money to another user. FIG. 5 shows how data blocks are chained together by hash functions based on a Merkle table that acts as a hash ledger. The advantage of blockchain infrastructure to centralized infrastructures like PKI that use central ledgers is that blockchain is harder to compromise because distributed hash ledgers are used.

With expansion of workflow based document exchange platforms, there exists a need to integrate and use existing platforms for user verification. More specifically, there is a need for a system and method that leverages existing PIV card platforms to allow verified users to sign documents regardless of format for exchange between counterparties using an existing PKI infrastructure. In another instance, there is a need for a system and method that uses biometric data and user communities to obviate the need for a central PKI authority.

SUMMARY OF THE INVENTION

Briefly, according to one embodiment of the present invention, a method executed in servers in which the servers interface with a Database Management System (DBMS) for signing and exchanging documents electronically. The documents are signed using biometric information of subscribers that sign the documents capturing biometric data blocks associated with a subscriber. A biometric key is generated at a subscriber node comprising a biometric hash derived deterministically from biometric feature elements of the biometric data blocks by a quantization that constructs intervals for each biometric feature element. The biometric hash is generated by mapping the biometric feature elements into the intervals. The biometric hash is sent to a plurality of observer nodes and a plurality of responses are received from the plurality of observer nodes. Each received response validates or invalidates the biometric hash based on the state of a biometric hash ledger associated with the subscriber at each one of the plurality of the observer nodes. The subscriber is authenticated based on responses that validate the biometric hash and the biometric hash is sent to the plurality of observer nodes to update all biometric the states of hash ledgers associated with the subscriber based on a time stamp sent from the subscriber node. The subscriber is allowed to sign a document if the subscriber is authenticated and if an entered PIN verifies the identity of the subscriber.

According to some of the more detailed features of this embodiment, the method executes a plurality of flow engines at each node used by the subscribers and observers, including a first flow engine for forwarding the biometric key of the subscriber and a plurality of second flow engines for forwarding biometric keys derived from biometric data associated with observers and exchanging biometric keys between the subscriber node and the observer nodes. The flow engines can comprise workflow engines that allocate tasks to the subscribers. This method can use the biometric hash in a block of a blockchain associated with the subscriber that is stored on a plurality of nodes and can authenticate the subscriber using a symmetric cryptography method that is based on using the biometric hash as a shared secrete in the symmetric cryptography method. In another way, the method can use the biometric hash in a block of a blockchain associated with the subscriber that is stored on a plurality of nodes and authenticating the subscriber using asymmetric cryptography that is based on using the biometric hash as a private key and a certificate that includes a public key derived from the biometric hash.

According to another embodiment, a method is executed in servers that interface with a Database Management System (DBMS) for signing and exchanging documents electronically. The documents are signed using cards that store biometric information of subscribers that sign the documents. The method requires storing a biometric key on a card given to a user. The biometric key is a hash derived deterministically from elements of biometric features of biometric data associated with the user by a quantization scheme that constructs intervals for each element of biometric feature. The biometric key is generated by mapping the biometric features into the intervals. The method requires receiving the private biometric key from a card reader over a network of nodes that employ a PKI infrastructure having a CA and receiving a certificate containing a public key that is derived from the hash. The card is authenticated based on the private biometric key on the card and the public key. The user is allowed to sign the document if the card is authenticated and an entered PIN verifies the identity of the user.

DETAILED DESCRIPTION OF THE INVENTION

The present invention uses a digital signature client software which communicates with SaaS software hosted in a wide area network on the cloud. A databases management system (DBMS) stores signed documents and digital signatures as further described below. The implemented signature technology enables organizations to implement a secure cryptographic signature controls which can be safely deployed among users or subscribers of the system, e.g., employees or customers, over any suitable interface for transmission of embedded biometric key information received from a user or subscriber. The biometric key information can be captured in real time through a verification device that interface with the user/subscriber or they can be received from a card reader that interfaces with a card given to the user/subscriber.

Figure 1:
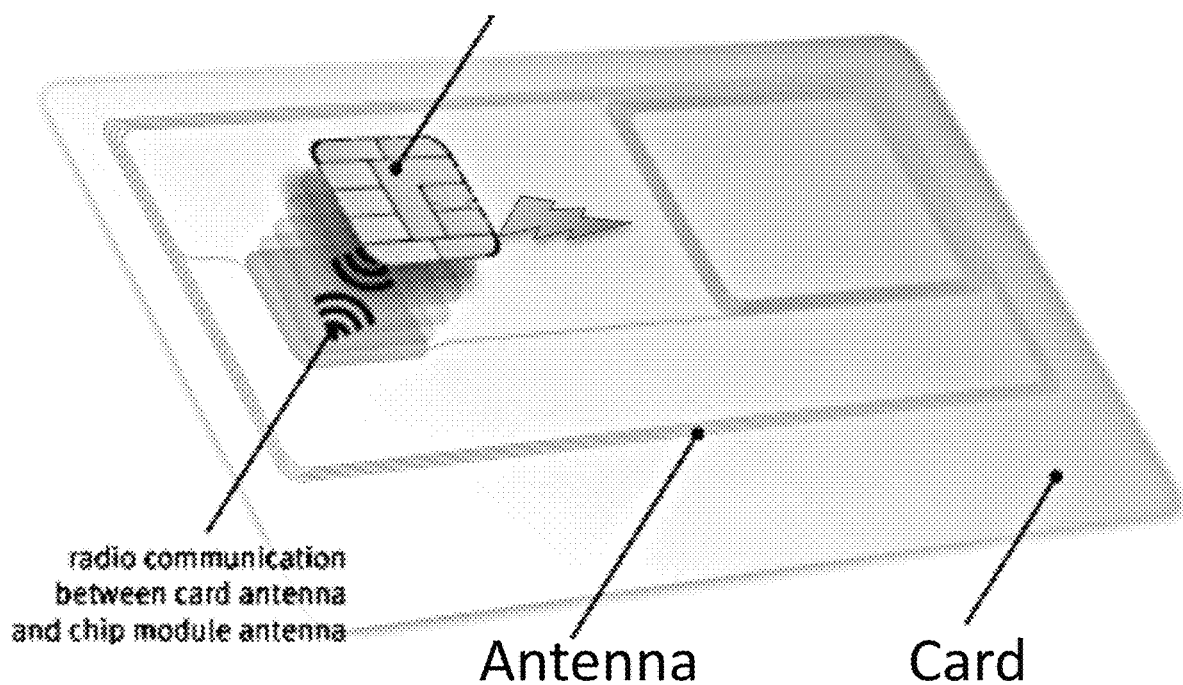
FIG. 1 shows a diagram of an inlay layer of a PIV card according to the present invention.

In one embodiment, the invention enables users carrying Personal Identity Verification (PIV) or Common Access Cards (CAC) cards to digitally sign documents based on biometric data stored on the cards using MFA. The present invention can be implemented to use biometric data based on parameters derived from finger prints, Iris scanning, voice recognitions, genetic recognition, etc., as long as such biometric parameters can be stored in binary form on embedded chip or magnetic elements in PIV cards, such as the one shown in FIG. 1. The present invention uses chips or magnetic strips to embed a biometric key belonging to a user that needs to be authenticated for signing any type of document or file of any suitable format, such as PDF, Excel, Word, JPEG, MPEG, image, text, etc. The biometric key can sign embedded code, binary, images or graphics in one or multiple input layers.

Figure 7:
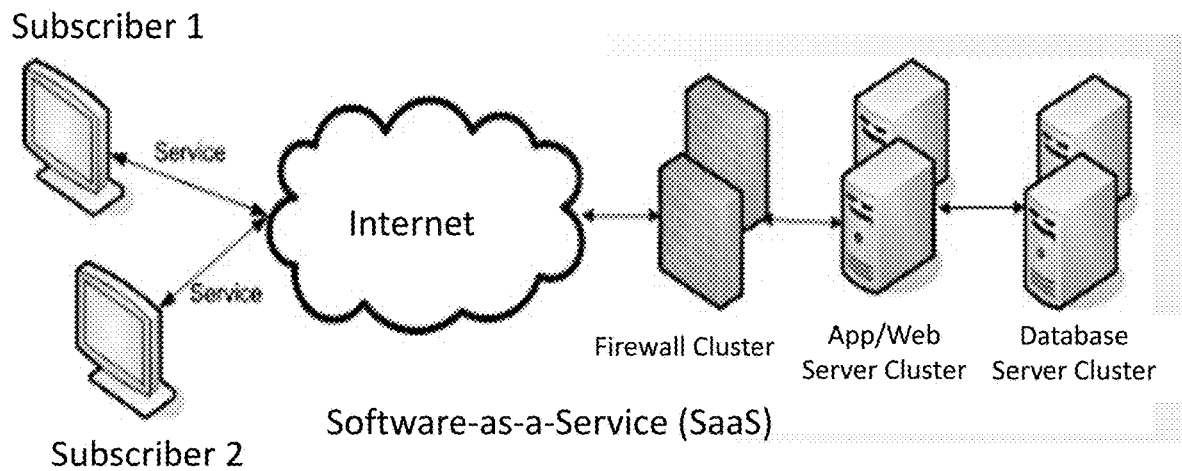
FIG. 7 is a block diagram of a system that implements an exemplary embodiment of the present invention via a PIV card reader.

In one embodiment, shown in FIG. 7, the invention is intended to accomplish the ability to integrate with an organization's existing PKI infrastructure leveraging the organization's previously provisioned PIV/CAC smart cards to digitally sign any document format. The cards communicate with an organization's Business Support System (BSS) system over HTTPS using PKI certificates, such as the x509 certificates, where roles can be stored as extensions on the PIV cards, e.g., <RBACRoles><Role></Role></RBACRoles>. According to this embodiment, the PIV card embeds user biometric data as the x509 private key itself to verify digital signatures. The corresponding public key is derived from the user's private biometric key.

Figure 2:
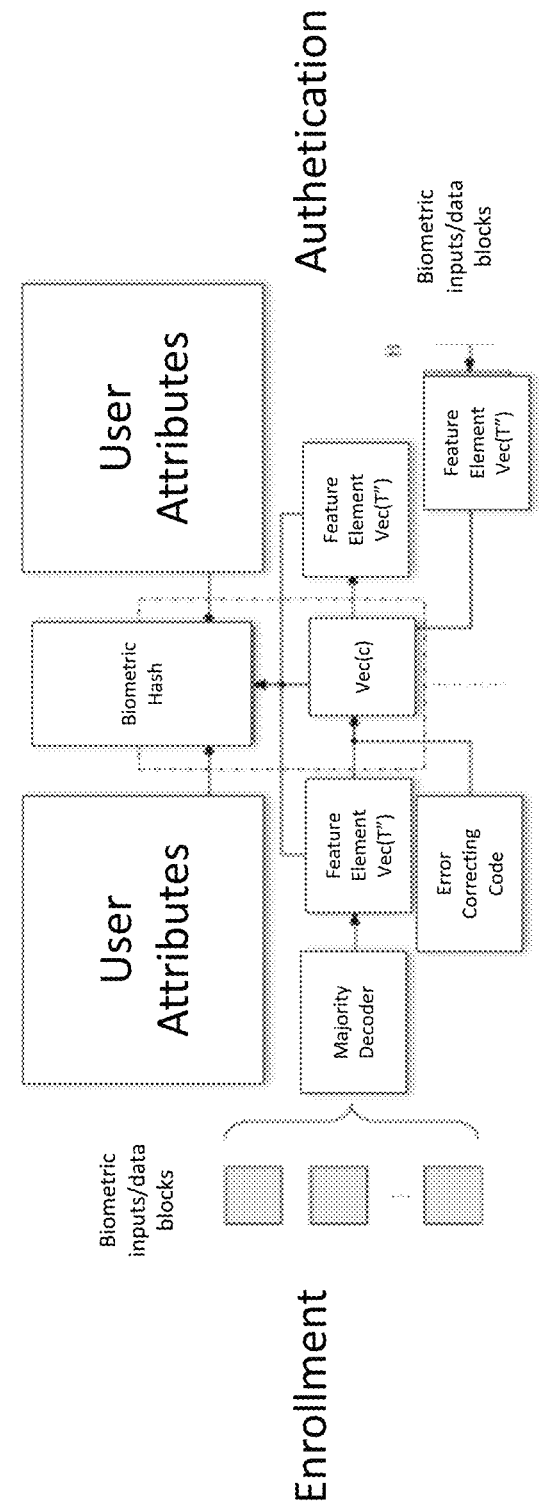
FIG. 2 shows basic operation block diagram of an Iris biometric crypto system that uses a biometric template.

As shown in FIG. 2, features of the biometric data are applied as biometric data input to a hash generator. FIG. 2 shows enrollment and authentication process used according to the present invention FIG. 2 using a biometric template. Biometric input (e.g., data blocks) are applied to a majority decider to extract feature element vectors that generate a biometric hash associated with user/subscriber attributes.

Figure 3:
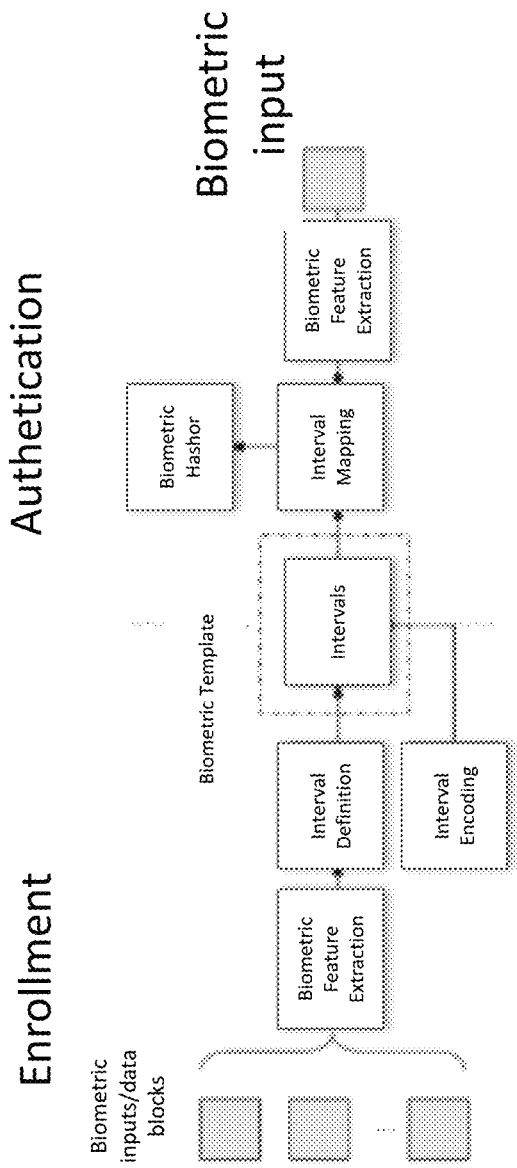
FIG. 3 shows block diagram of a quantization scheme that constructs intervals for each element of a feature vector shown in FIG. 2.
Figure 4:
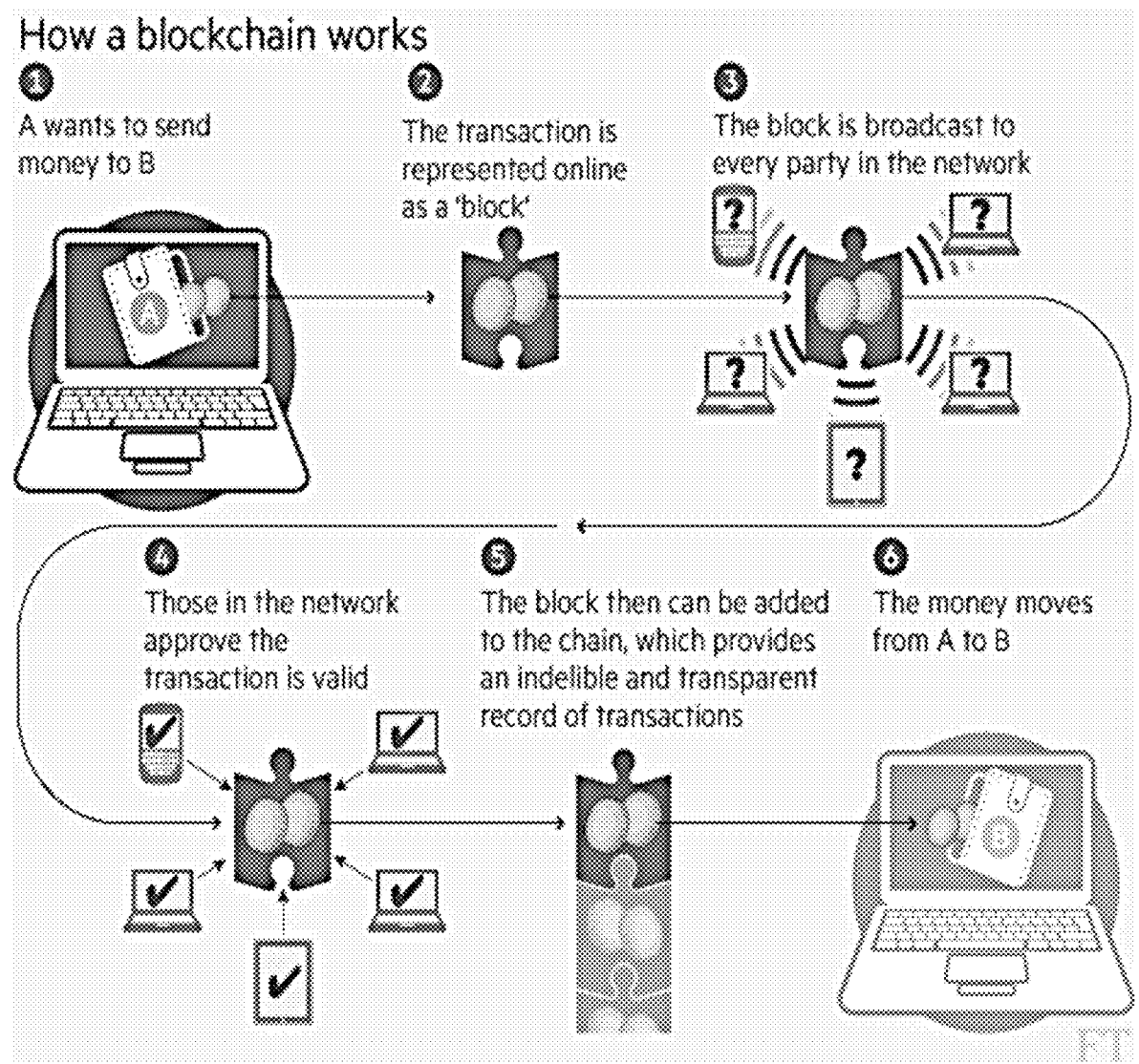
FIG. 4 shows a flow diagram of blockchain for when a user sends money to another user.

The biometric hash generator processes interval boundaries to generate the private biometric key deterministically as opposed to randomly. A quantization scheme shown in FIG. 3 can use in the enrollment and authentication process of FIG. 2 to construct intervals for each element of a biometric feature vector by mapping the biometric features into the intervals. The quantization uses biometric data input or data blocks to apply biometric features to an interval definition block. An interval encoding block is applied to an interval block with the interval definitions to generate intervals that are mapped to biometric features to generate a biometric hash.

Under this embodiment, asymmetric cryptography is applied to e-signatures based on public keys that are deterministically, i.e., non-randomly, derived from the private biometric key. To the contrary, the prior art applies the biometric data to a random number generator to generate the public and private keys. Unlike the prior art, the public key generator of this embodiment of the invention receives the private biometric key and generates the public key based on the deterministic biometric boundaries associated with the private biometric key. In this way, documents can be signed based on verified biometric parameters that act as embedded private keys in a PKI infrastructure that uses public key certificates.

Figure 5:
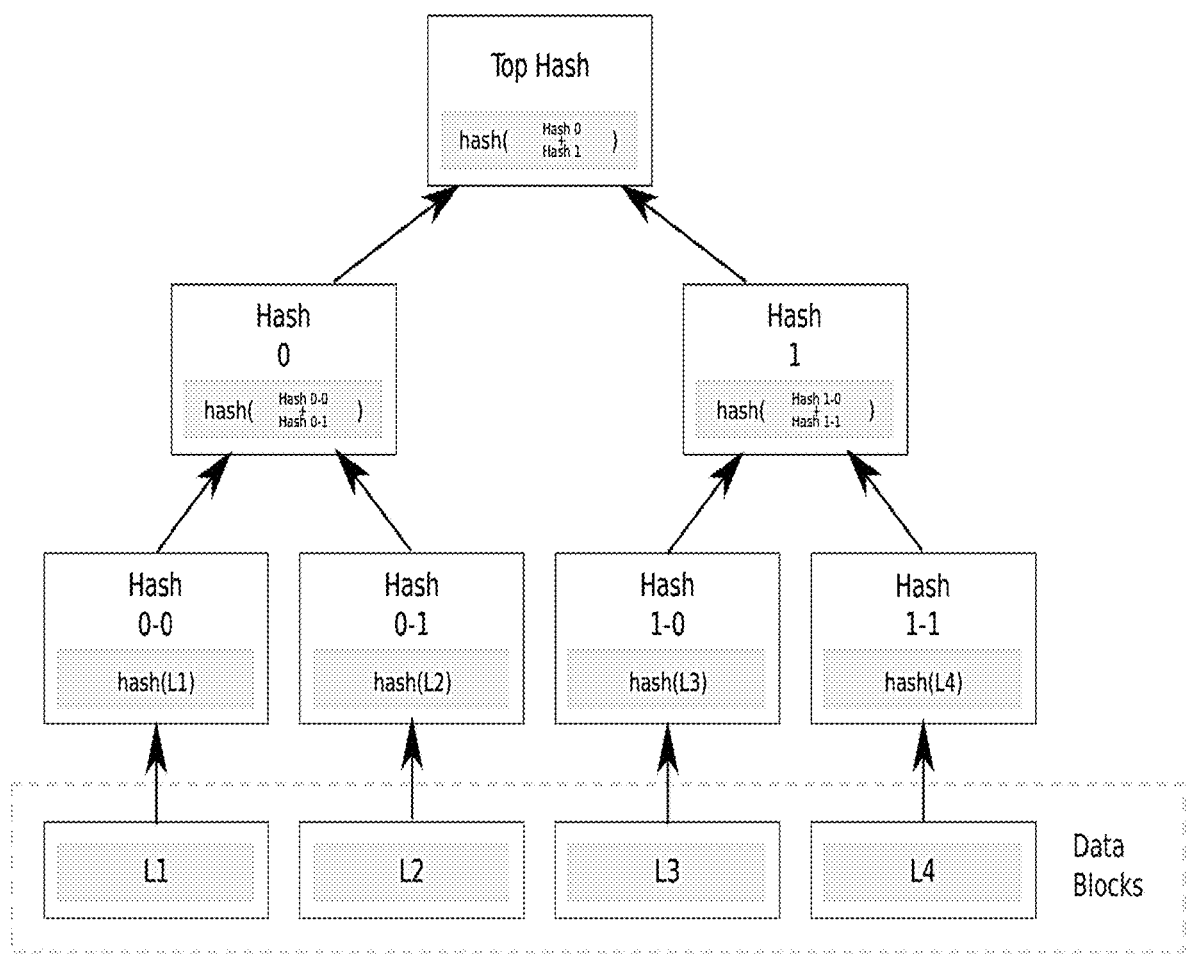
FIG. 5 shows how data blocks are chained together based on a Merkle table.
Figure 8:
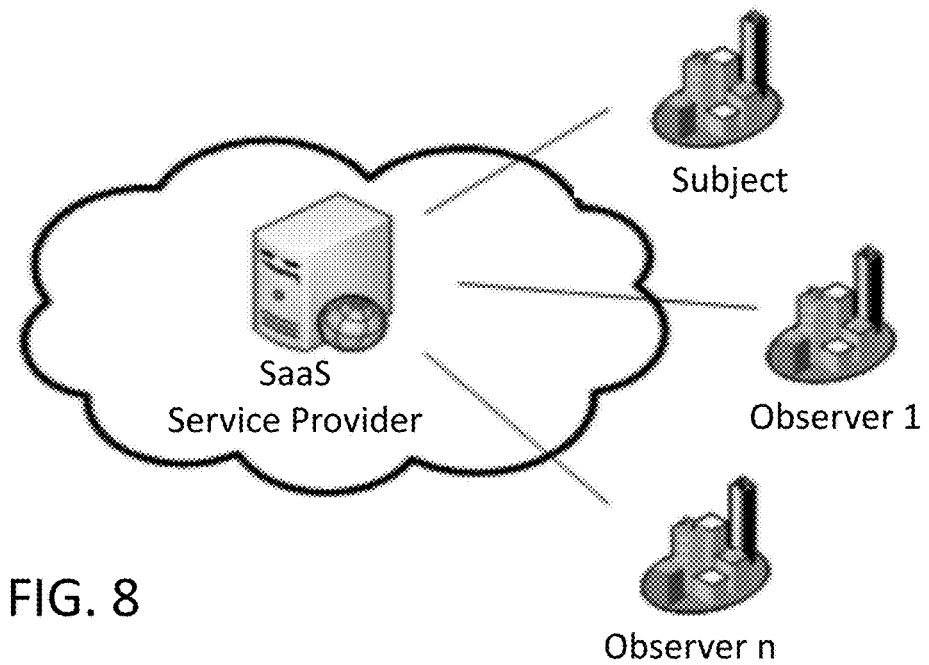
FIG. 8 shows a block diagram of a Business Support System (BSS) system implementing the present invention on a Software-as-a-Service (SaaS) platform.

In another embodiment, shown in FIG. 8, the invention is intended to accomplish the ability to digitally sign and share documents amongst a group of subscribers without the need for a PKI infrastructure. This embodiment of the invention applies blockchain technology to digitally sign documents based on biometric keys. For e-signing documents under this embodiment, symmetric or asymmetric cryptography using hashes are applied to a blockchain. The chaining of hash blocks is shown in FIG. 5 based on biometric keys comprising hashes that are deterministically, i.e., non-randomly, generated.

Figure 6:
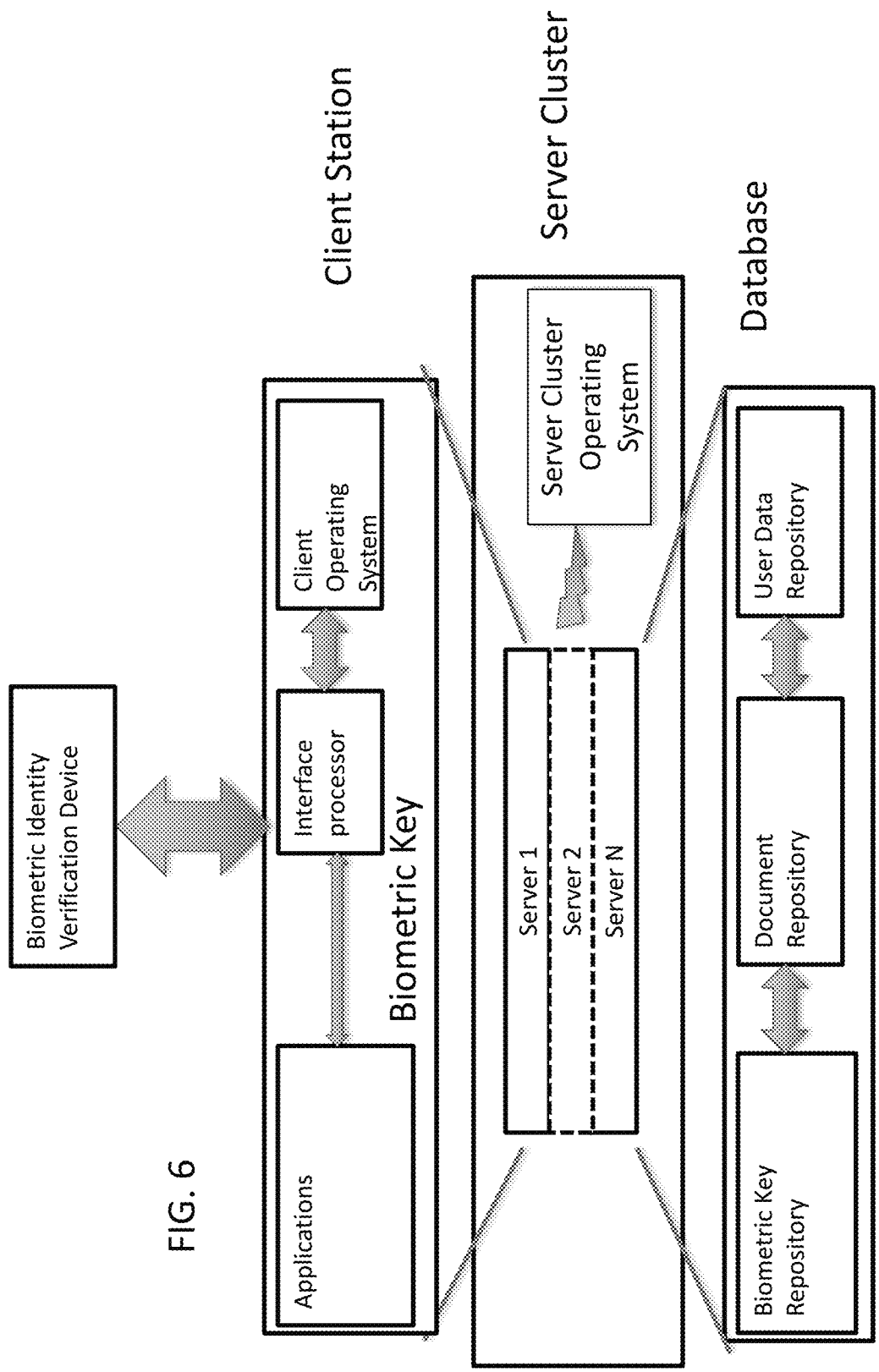
FIG. 6 shows block diagram of the system of the present invention.

FIG. 6 shows the system of the present invention implemented comprising one or more clients, server clusters and central or distributed databases over a network of nodes that interface with the users or subscribers of the system. A node usually includes a processing unit, such as one or more CPUs, microprocessors, embedded controllers, digital signal processors, etc, for executing codes, programs, and/or applications. In an observer pattern implementation of the present invention described in FIG. 8, a subscriber node is a node at which a user signs a document and an observer node is a node that stores a hash ledger state of each user's biometric hash, paraphrase/PIN hash and time stamp. Each node can be any one or combination of a wired or wireless node, a client, a server, a router, a hub, an access point, or any other known device which communicates with other devices using resources. One or more data bases store private biometric key on public key certificate, signed documents and user data repositories.

Under one arrangement, multiple levels of identity verification can be implemented under MFA where biometric parameters are used to authenticate something the user/subscribers have and PINs are used to verify something they know. A PIN code is entered in an input device can be used for the verification. To authenticate something the user or subscriber has, a biometric identify verification device, e.g., finger print scanner, Iris scanner or microphone or gene scanner can capture corresponding biometric data from the user or subscriber and transmit such data to a node via wired or wireless transmission mediums. If a PIV card is used, a card reader reads embedded private biometric key stored on the card and sends the private key to a node that has the corresponding public key on the X.509 certificate. The public key is derived from the private biometric key embedded in the PIV card as described above. Information contained in X.509 certificate is used to authenticate a user for example using the SSH protocol. If a PIV card is not used, the biometric data represents captured biometric data blocks, which are used to generate a biometric hash at a subscriber node. The subscriber node sends the biometric hash to a plurality of observer nodes that validate the hash by sending validation responses based on hash ledgers states at each observer node. If most of the observer nodes validate the biometric hash, the subscriber is authenticated for signing documents under any role a subscriber may have in an organization.

The system and method described herein relates to various aspects of processing documents that are signed and exchanged within or between users. As herein defined, documents can be any type of electronic file that is formatted to convey a declaration, statement or affidavit and/or one or more terms and conditions information associated with parties. The documents can be formatted in any known file type, such as Microsoft Word or Excel or a portable format such as Adobe PDF, etc. The documents can be of infinite size as the system handles breaking very large documents into multiple signed parts. Documents can be signed based on biometric keys, i.e., hashes, and sent via e-mail to counterparties. In another embodiment, subscribers/clients can exchange biometric keys with other subscribers based on flow engines that can also be used to exchange signed documents. In one example embodiment, a Business Support System (BSS) is implemented on an electronic document exchange and collaboration Software-as-a-Service (SaaS) platform referred to as the BSS exchange service. The BSS exchange service is centrally hosted and uses a software licensing and delivery model on subscription basis. The BSS exchange service provides an enterprise contract-modeling environment with a set of tools and features to aid creation of statements, declarations, bilateral contract documents that need to be signed.

FIG. 7 shows a block diagram of a SaaS platform offering the BSS exchange service embodying PKI infrastructure for signing documents. The SaaS platform comprises an Application/Web Server Cluster of one or more servers, which communicates with a Database Server Cluster of one or more databases. The SaaS platform provides the BSS exchange service to the subscribers 1 and 2 over the Internet via a firewall Cluster of one or more firewalls. One such the BSS exchange service is offered by Netcomm under the name Beacon™ at the following domain: http://www.netcomm.net/beacon.

FIG. 8 shows the BSS system implemented using an observer pattern software design that implements distributed event handling systems in "event driven" software that implements a blockchain. Most modern languages such as Java and C# have built in "event" constructs. The design defines a one-to-many dependency between objects so that when one object changes state, all its dependents are notified and updated automatically. More specifically, an object, called the Subject, maintains a list of its dependents, called observers, and notifies them automatically of any state changes, usually by calling one of their methods. The design encapsulates the core (or common or engine) components in a Subject abstraction, and the variable (or optional or user interface) components in an Observer hierarchy. Observers register themselves with the Subject as they are created. Whenever the Subject changes, it broadcasts to all registered Observers that it has changed, and each Observer queries the Subject for that subset of the Subject's state that it is responsible for monitoring. The Subject may "push" information at the Observers, or, the Observers may "pull" the information they need from the Subject.

Figure 9:
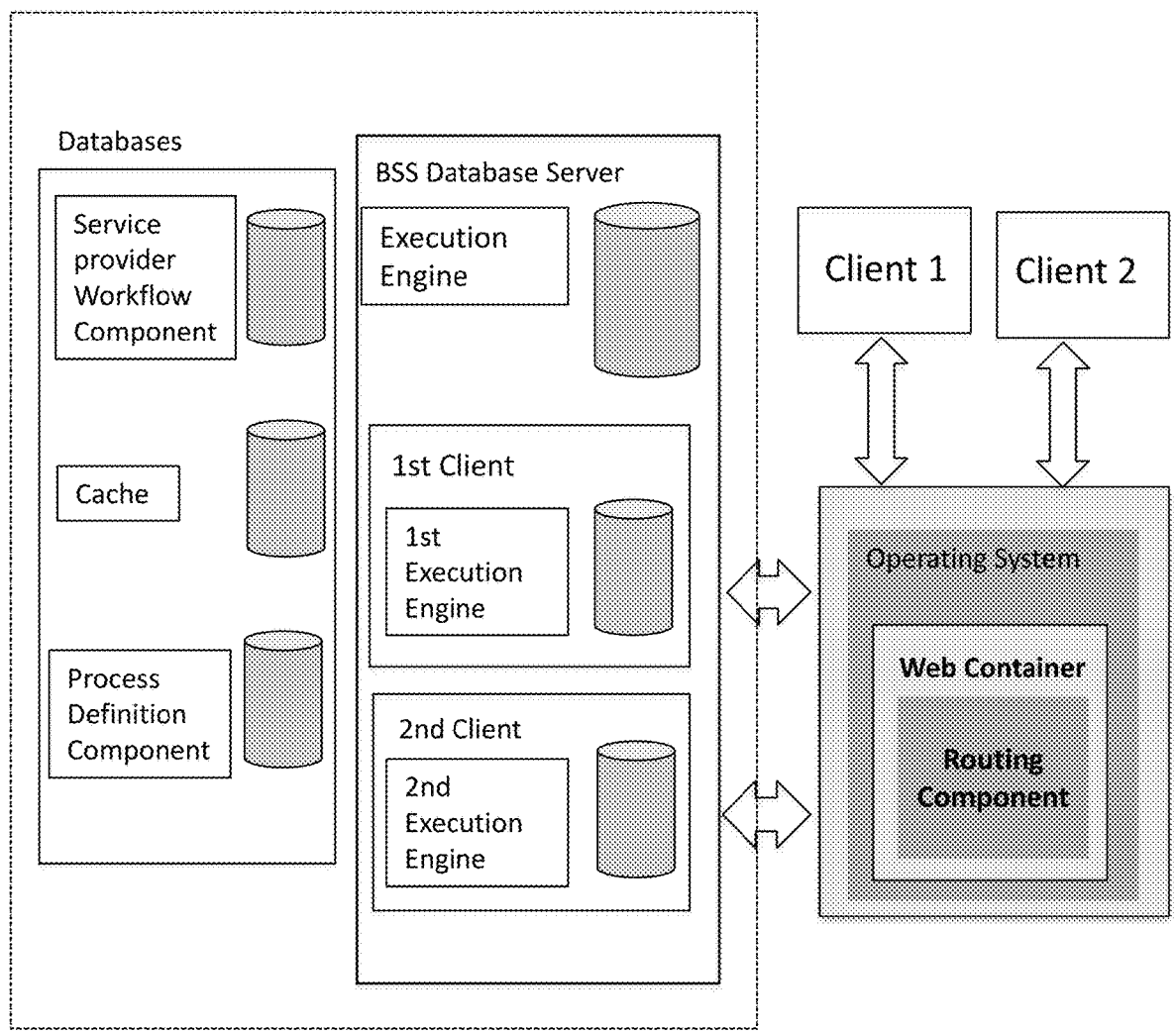
FIG. 9 shows the BSS system implemented as a BSS exchange service subscribed by a plurality of users.

FIG. 9 shows a functional block diagram of the BSS system of FIG. 7 or 8. As shown, the BSS system comprises a SaaS platform associated with the BSS exchange service that interfaces with Clients 1 and 2, which are subscribers of the system. A process executer/dispatcher in servers communicates messages and signed documents between Clients 1 and 2 via a servlet container (Web Container). Communications can be conducted via a Message Oriented Middleware (MOM), which supports sending and receiving messages between distributed components of the BSS exchange service. Communications between Clients 1 and 2 and the BSS are achieved via a router that is implemented as a "Routing Component (RC)".

As shown in FIG. 9, the SaaS platform of the BSS exchange service comprises a BSS database server, e.g., SQL servers, a BSS databases and the router RC. The RC communicates with the BSS database server to access the BSS database. The BSS database server executes the necessary processes for implementing the BSS exchange service components. The BSS database further stores user related information, e.g., username, email address, last login data and time, last IP address, last computer name, as well as log of all user activities and system messages. Also stored is information about Portal Users created on the SaaS platform. Electronic versions of contract documents signed between the service providers can be stored in the BSS database.

As shown, the BSS Data Server has an execution engine for implementing the BSS exchange service. A first and a second execution engines form separate service components for the first and second clients on the SaaS platform, where information and configurations of each client are applied. A shared database includes a process definition component that defines various processes to be executed in the SaaS platform. A cache component speeds execution of processes via well-known memory management techniques. A workflow component is a software application for business process management that creates separate workflow engines for each service provider. A workflow engine facilitates the flow of biometric keys among subscribers and observers since subscribers can be observers. Each workflow engine allocates tasks to different executors and communicates data among participants. The workflow component can execute any arbitrary sequence of steps, monitor the state of activities in a workflow and determine which new activity to transition to according to defined processes. The actions may be anything from saving a document to sending e-mail to users. Further included in the workflow components are business rules engines. Each business rule engine is a software system that executes one or more business rules in a runtime environment. A business rule system enables policies and other operational decisions to be defined, tested, executed and maintained separately. Rule engines typically support rules, facts, priority, mutual exclusion, preconditions, and other functions. One known workflow engine that can be used with the present invention is Activiti Java Workflow Engine (JWE). JWE provides generic APIs for defining and administrating business processes, using several components or tools. A Workflow Editor (WE) tool is used for creating, managing and reviewing process definitions.

Under one example, the first and second subscribers can become paired to exchange signed agreement documents based on biometric data of users that sign documents on digital signature workstations that have biometric verification devices and/or card readers. In this way, the method executes a plurality of flow engines at each node used by the subscribers and observers, including a first flow engine for forwarding the biometric key of the subscriber and a plurality of second flow engines for forwarding biometric keys derived from biometric data associated with observers and exchanging biometric keys between the subscriber node and the observer nodes. The flow engines can comprise workflow engines that allocate tasks to the subscribers.

Figures 10, 12:
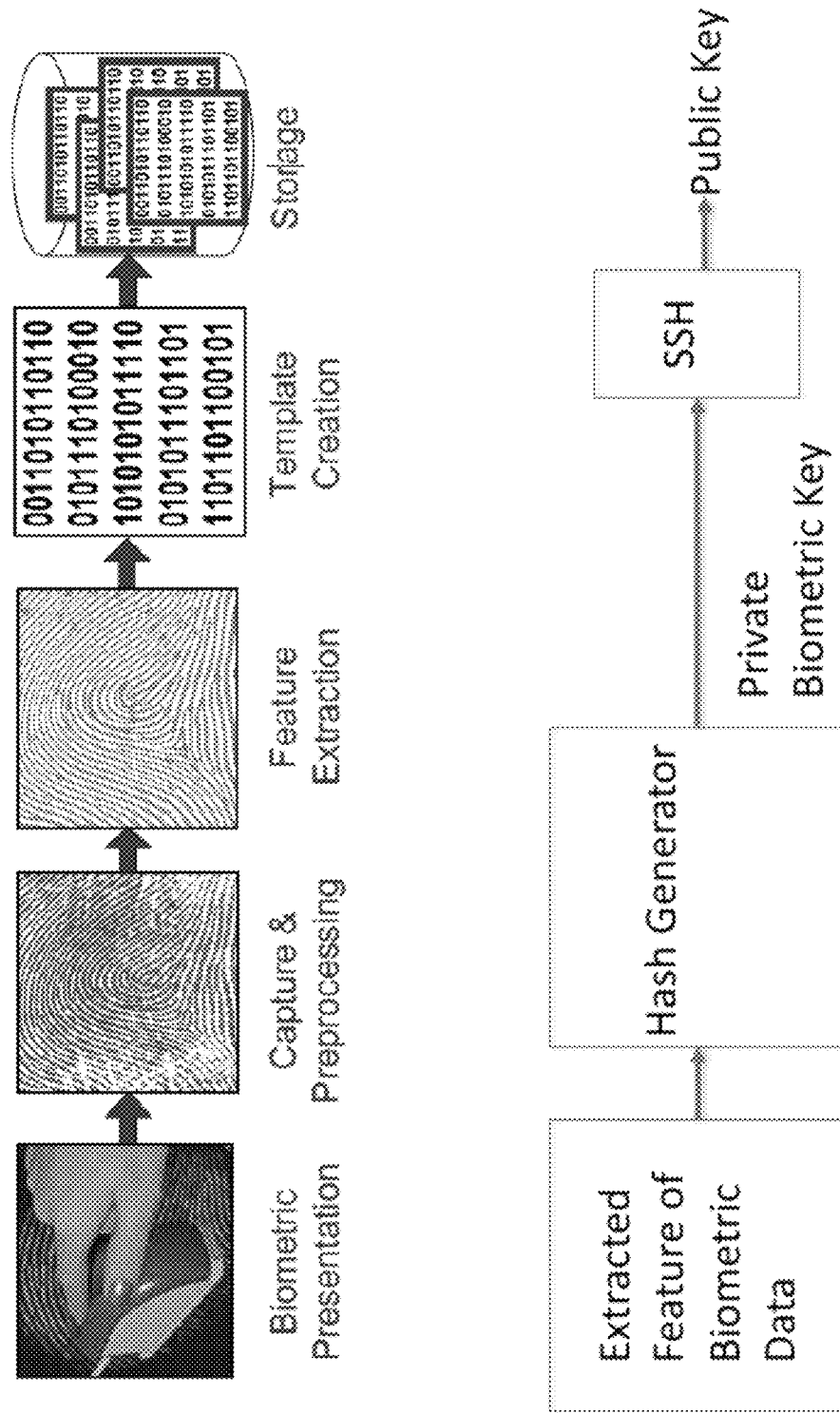
FIG. 10 shows generating a public Key form a private biometric key using Secure Shell (SSH).
FIG. 12 shows generating a public key form a private biometric key using Secure Shell (SSH).
Figure 11:
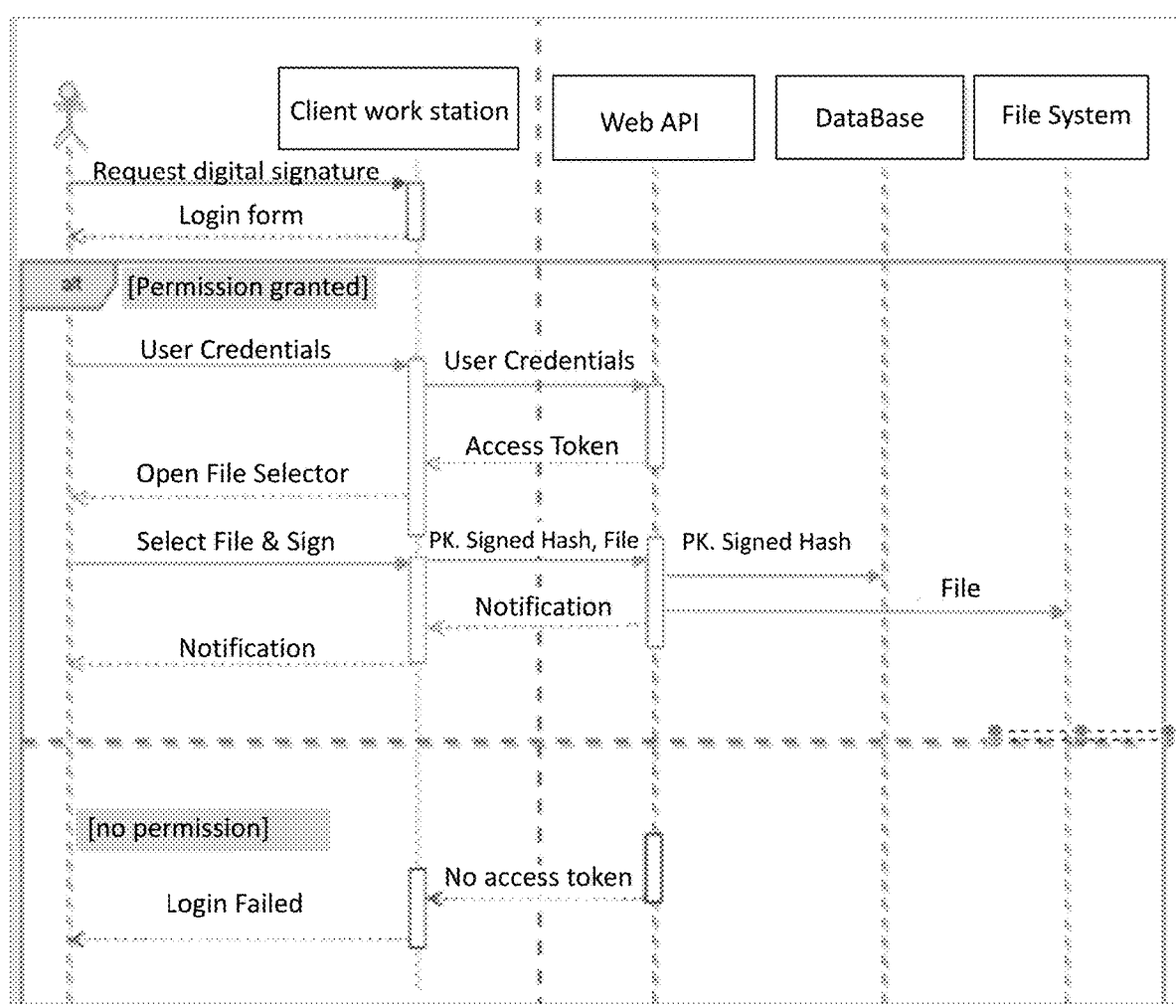
FIG. 11 shows a block diagram of how biometric verification can be implemented in the present invention.

FIG. 10 shows generating a public Key from a private biometric key using Secure Shell (SSH) implementing the system shown in FIG. 7. FIG. 11 shows one example of a user interface sequence flow diagram for signing documents using an MFA digital signature protocol and algorithm based on the following:
X.509 biometric private key
PIN prompt As shown in FIG. 11, a user requests digital signature from a client workstation, for example via a downloadable form. If permission is granted, the client work station interfaces with a Web API for sending user credentials. The Web API returns an access token to the client station enabling the user to open a file selector application. The user then selects a file and signs it with a biometric key at the client station (a user/subscriber node). The client station sends a corresponding signed hash and the signed file to the Web API, which optionally send a receipt notification to the client station. The Web API forwards the signed hash to the databases and the signed file to a file server. If permission is not granted, log in fails and no access token is sent to the client work station.

FIG. 12 shows a block diagram of how biometric verification can be implemented in the present invention. A biometric representation is captured and processed for extracting certain features that are represented by binary data within stored templates. Various formats for the interchange of biometric data include common file formats that provide platform independence and separation of transfer syntax content definition as well as application program interfaces and application profiles that operate based on performance metric definitions and calculations. The present invention uses known interfaces and interactions between biometric components and subsystems. Architecture and operation of the biometric component of the system is based on standards that support multi-vendor systems and their applications. Examples of standards include:
ANSI INCITS 358-2002 BioAPI Specification v1.1
ANSI INCITS 398-2005 [NISTIR 6529-A] Common Biometric Exchange File Format (CBEFF).
Representation of formats for the interchange of biometric data include:
Finger Pattern Based Interchange Format
Finger Minutiae Format for Data Interchange
Face Recognition Format for Data Interchange
Iris Interchange Format
Finger Image Based Interchange Format
Signature/Sign Image Based Interchange Format; and
Hand Geometry Interchange Format Various biometric based standards may be used in the present invention, including, ANSI INCITS 383-2003 Biometrics-Based Verification, which is hereby incorporated by reference. Other examples include, ANSI INCITS 358-2002 BioAPI Specification v1.1 and ANSI INCITS 398-2005 [NISTIR 6529-A] Common Biometric Exchange File Format (CBEFF), which are also hereby incorporated by reference. Still other examples incorporated herein by reference include ANSI INCITS 377-2004 Finger Pattern Based Interchange Format, ANSI INCITS 378-2004 Finger Minutiae Format for Data Interchange, and ANSI INCITS 379-2004 Iris Image Interchange Format. It is understood that these examples are not exhaustive of all biometric standards that can be used with the present invention.

Figure 13:
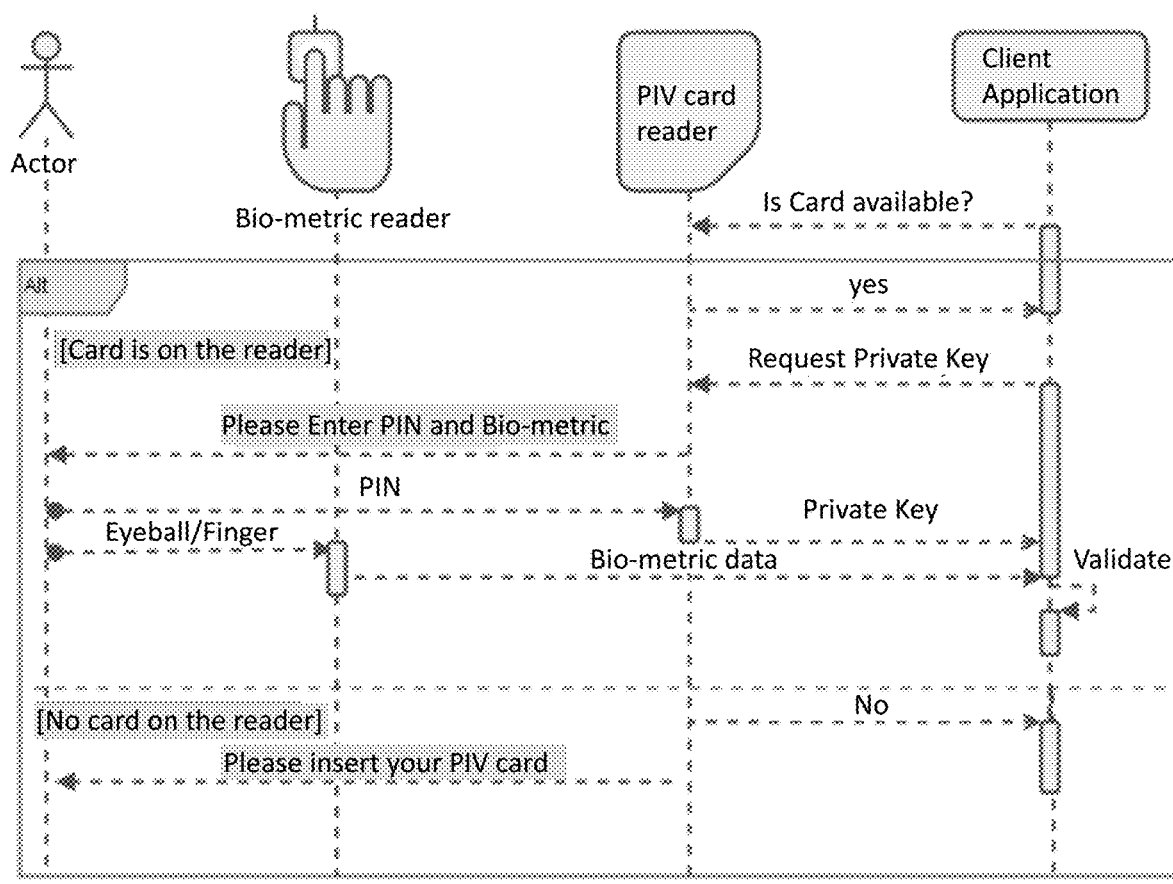
FIG. 13 shows a flow diagram of the present invention implementing user verification using a PIV card reader with a biometric reader.

FIG. 13 shows a flow diagram of the present invention implementing user verification using a biometric reader and a PIV card reader in a client application involving the signing of documents by a user shown as an Actor. In one implementation, it is assumed that the Actor inserts his or her PIV card into the reader, where the application would request the private biometric key of the user which is embedded on the PIV card. The biometric reader would receive captured biometric data, e.g., via a finger or eyeball scan The card reader would receive a PIN and the private biometric key, which is passed on to the client application for user verification. If the Actor has not inserted the PIV card into the card reader, the client application would prompt the user to insert the card into the reader.

Figure 14:
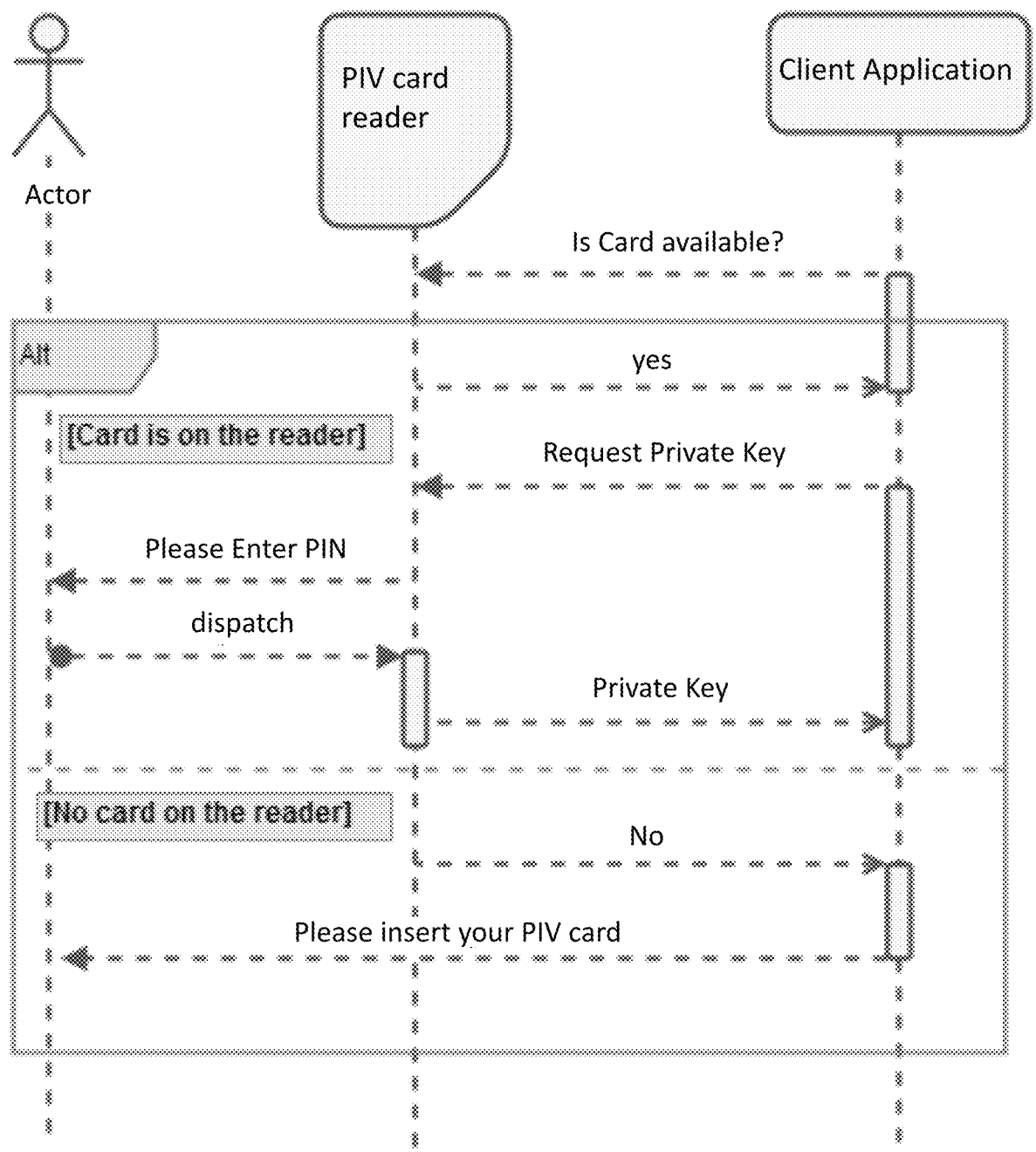
FIG. 14 shows a flow diagram of the present invention implementing user verification using a PIV card reader without a biometric reader.

FIG. 14 shows a flow diagram of the present invention implementing user verification using a PIV card reader in a client application involving the signing of documents by a user shown as an Actor with a PIN. In one implementation, it is assumed that the Actor inserts his or her PIV card into the reader, where the application would request the private key of the user which is embedded on the PIV card. Then, the PIV card reader sends the user's private key to the client application for signing a document along with an entered PIN.

Figure 15:
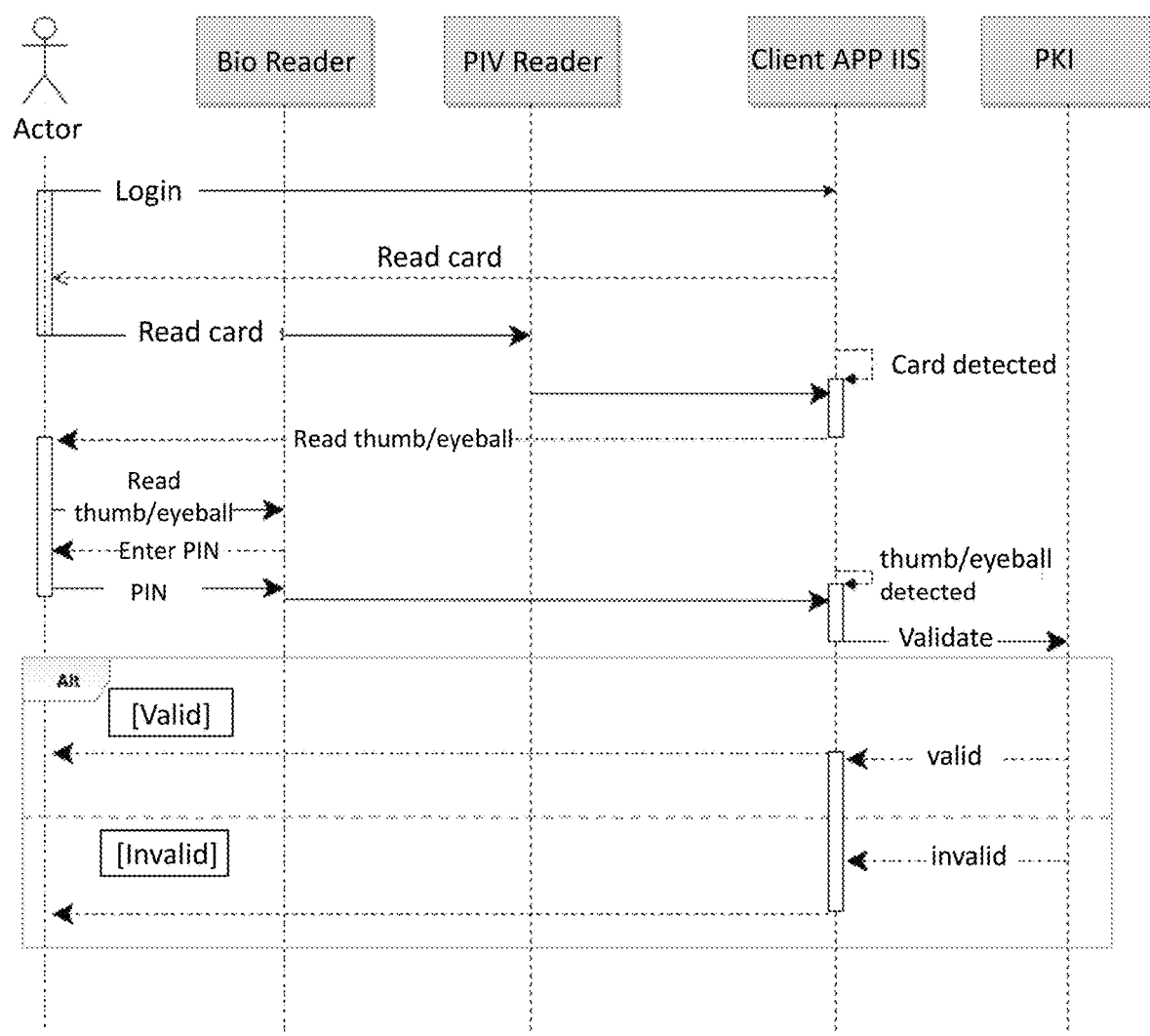
FIG. 15 shows a flow diagram of the present invention implementing user verification using a PIV card reader, PIV cards issued with Biometric private key data, and a Biometric reader.

FIG. 15 shows a flow diagram of the present invention implementing user verification using a biometric reader and a PIV card reader in a client application involving the signing of documents by a user shown as an Actor. In one implementation, it is assumed that the Actor inserts his or her PIV card into the reader, where the application would request the private biometric key of the user which is embedded on the PIV card. The card reader would receive a PIN and the biometric reader would receive captured biometric data, e.g., via a finger or eyeball scan, which is passed on to the client application for user verification. This method provides the biometric data and private biometric key and PIN under MFA. This method uses private key as PKI private key pairing to public key generated by PKI.

In this embodiment, the input to the authentication validation algorithm would consist of the following inputs:
 1. x509 PKI private biometric key (stored on PIV card, user doesn't hand enter). Something you have.
 2. Biometric data. Something you have/are.
 3. PIN (hand entered, not stored on card, PKI resolves). Something you know.

Under this arrangement, the private key stored on the PIV card is the actual biometric data serving as the private biometric key. For example, thumbprint/eyeball data can be the private biometric key stored on the PIV card, so the input to the algorithm would just be the thumbprint/eyeball data plus PIN with the following inputs:
 1. The biometric key stored on card, i.e., thumbprint/ eyeball data. This resolves the something you have/are criterion.
 2. Biometric data input which would be compared against captured data. This resolves the something you have/ are criterion.
 3. PIN which is hand entered, not stored on the card. This resolves the something you know criterion.

Figure 16:
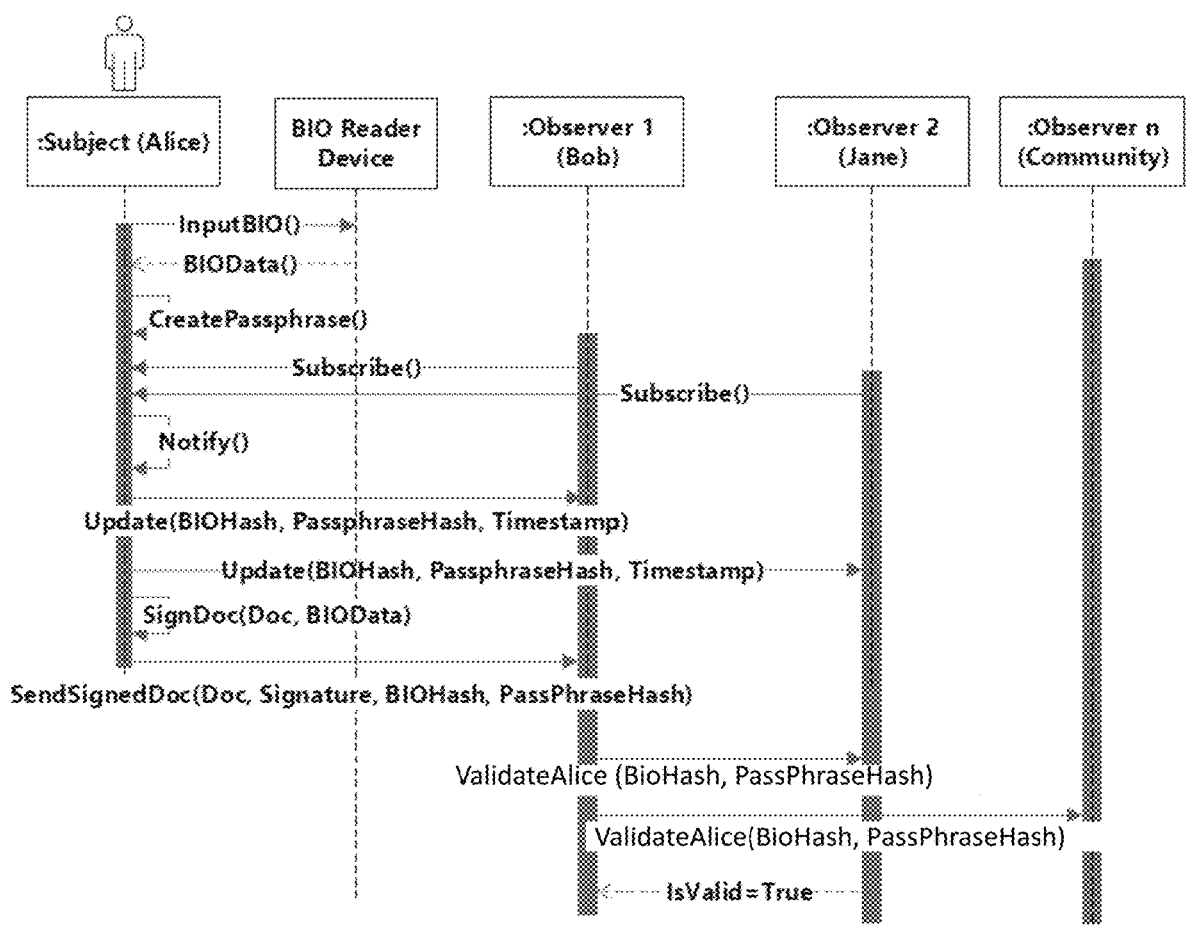
FIG. 16 shows a flow diagram of the present invention implementing biometric data as the private key, a 2FA passphrase and a distributed user community validation that uses blockchain.

In another method without PKI, a community of observers and subject shown in FIG. 8 validates the hash of a biometric key with a passphrase under MFA using a blockchain hash ledger. In this case, no one point in a matrix nodes has anything sensitive but the subject. For example, if Alice decides she wants to digitally sign documents with Bob, Jane and Len. Alice is the subject and Bob, Jane and Len are the observers. They establish a common observer pattern architecture, where Alice, the subject, sends all observers the following:
 1. An arraylist hash of her acceptable biometric data. Something you have.
 2. A hash of a PassPhrase/PIN she chooses. Longer length, more character set, more secure. Something you know.
 3. Timestamp Now everyone is ready to receive Alice's digitally signed messages/documents. So Alice sends Bob the following:
 1. Alice→SendSignedDoc (Doc, Signature, Bio Hash, PassPhrase Hash, Timestamp)→Bob Bob is not sure this is Alice, so she sends the biometric hash values to Jane and Len to validate the hash against their known hash ledger of record.
 1. Bob→Validate(Alice, Bio Hash, PassPhrase Hash, Timestamp)→Jane
 2. Bob→Validate(Alice, Bio Hash, PassPhrase Hash, Timestamp)→Len A plurality of response validating or invalidating the Bio hash and time stamp are received from the observer nodes. If most observers validate Bob will be convinced that this is indeed Alice's signature. The subject, Alice, is free to change her PassPhrase/PIN at any time and push the new hash out to all subscribers who would maintain and update hash ledger entries of all of Alice's Bio Hash and PassPhrase/PIN data. The blockchain community prevents fraud collectively using decentralized authorities. FIG. 16 shows a flow diagram of the present invention implementing user verification using a Biometric reader and a user community of subscribers who have agreed to share digitally signed documents. All users subscribe to one another creating a matrix community of users capable of validating any user/ subscriber within the community by majority rule based on hash ledgers that observer nodes maintain and update. Each user can be a subscriber or an observer or be both a subject and an observer in the system, which supports a multitude of widely available 3rd party 2 Factor authentication vendors, such as DUO Security and Google Authenticator to securely establish who is who. Each subject/subscriber can authenticate with the system independently through supported $3^{rd}$ party MFA authentication applications.

This method can use the biometric hash in a block of a blockchain associated with the subscriber that is stored on a plurality of nodes and can authenticate the subscriber using a symmetric cryptography method that is based on using the biometric hash as a shared secrete in the symmetric cryptography method. In another way, the method can use the biometric hash in a block of a blockchain associated with the subscriber that is stored on a plurality of nodes and authenticating the subscriber using asymmetric cryptography that is based on using the biometric hash as a private key and a certificate that includes a public key derived from the biometric hash.

Each user/subject initiate use of the system to share digitally signed documents by downloading a small client application which will store their biometric data and passphrase/PIN on a local client application authenticating with a 3rd party 2 Factor authentication scheme. Other users/observers subscribe to any individual user in the system to establish exchange of signed documents by supplying their authentication token from several supported vendors.

Users digitally sign documents using a hash of the Biometric data stored on their local instance. Users send other users signed documents along with a Biometric hash and Passphrase/PIN hash with which the user community validates the identity by majority vote based on each subject's copy of the observer's hash data.

This system is anonymous in that each observer validates a user with no knowledge of the user as it's based solely on a hash of the subject's biometric data and passphrase/PIN. This system is also highly redundant using a blockchain methodology in that some threshold of n nodes not responding or responding in the negative, will not impact the ability of a majority positive response from the decentralized community. Further, the only private user information is stored on each subject's local application. A compromise of one node yields information for a single subject vs. millions of users as is a common risk with a centrally held authoritative source, such as common PKI infrastructure. This matrix system validates identity but the matrix does not require the plaintext document to provide a validation assertion by group majority. This matrix system maintains high performance by storing all validation assertions from the group on the local subject's machine optimized for quick reads and taking into account each node's computing ability. The algorithm to determine a group majority combines locally stored knowns, messages out to a few random group observers, among other variables.

Non-repudiation is achieved via large group consensus. If the BioHash and Timestamp data was deemed valid by majority rule, Alice signed the document. Further, Alice's hash of her biometric data can always be regenerated by Alice or further investigated by other independent third parties, including the body of observers, to refute authenticity of the signature.

Figure 17:
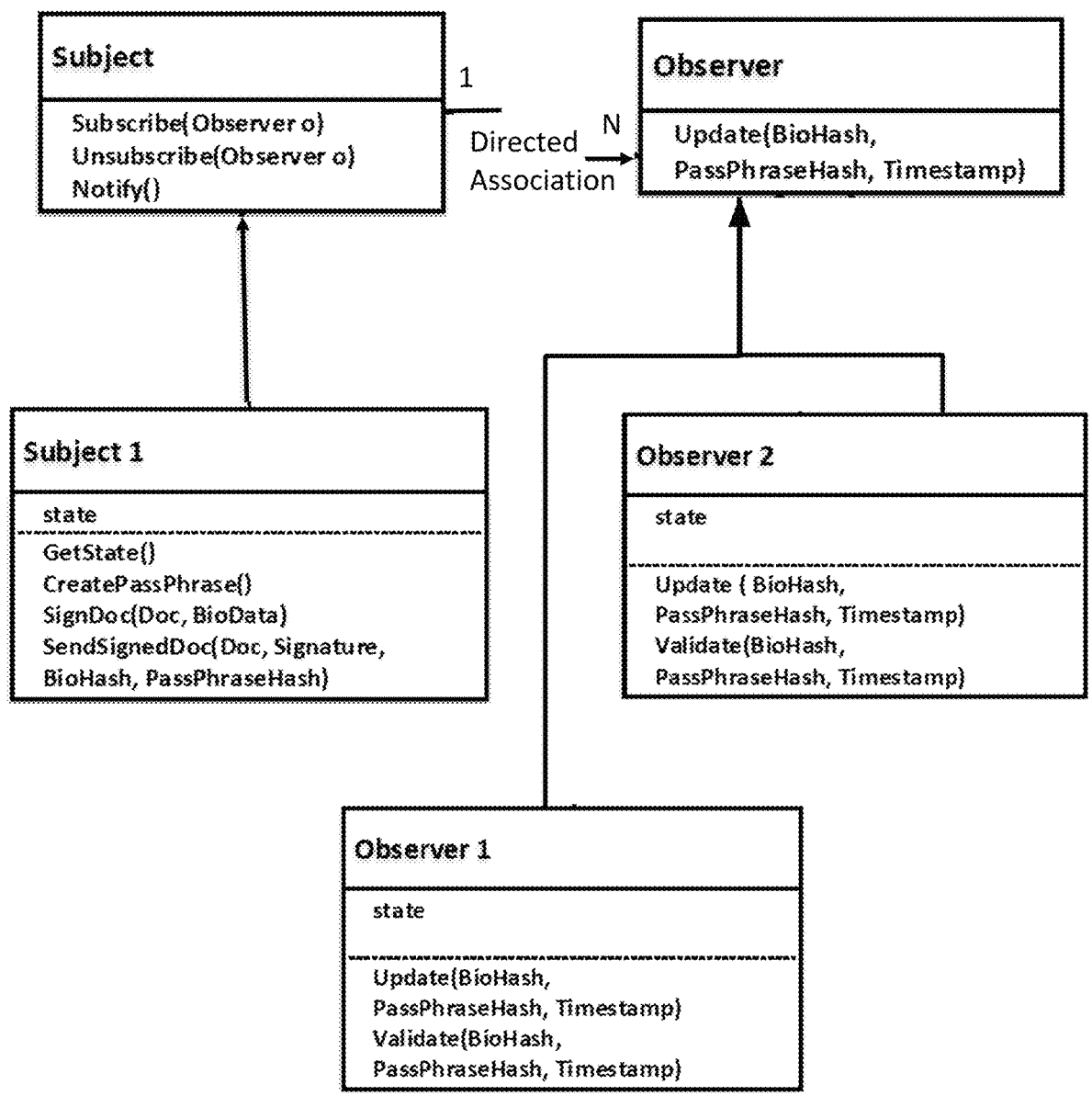
FIG. 17 shows an entity diagram of the present invention depicted in the FIG. 16 flow diagram as an entity diagram of the class structure of subjects and observers.

FIG. 17 shows an entity diagram of the present invention depicted in the FIG. 16 flow diagram as an entity diagram of the class structure of subjects and observers.

The invention claimed is:

1. A method executed in servers that interface with a Database Management System (DBMS) for signing and exchanging documents electronically, said documents being signed using biometric information of subscribers that sign the documents, the method comprising the steps of:
   a. capturing biometric data blocks associated with a subscriber;
   b. generating a biometric key, at a subscriber node, comprising a biometric hash derived deterministically from biometric feature elements of the biometric data blocks by a quantization that constructs intervals for each of the biometric feature elements, where the biometric hash is generated by mapping the biometric feature elements into the intervals;
   c. sending the biometric hash to a plurality of observer nodes;
   d. receiving a plurality of responses from the plurality of observer nodes; each received response validating or invalidating the biometric hash based on a biometric hash ledger associated with the subscriber at each one of the plurality of the observer nodes;
   e. authenticating the subscriber based on responses that validate the biometric hash;
   f. sending the biometric hash to the plurality of observer nodes to update all biometric hash ledgers associated with the subscriber based on a time stamp sent from the subscriber node; and
   g. allowing the subscriber to sign a document if the subscriber is authenticated and if an entered PIN verifies an identity of the subscriber.

2. The method of claim 1 further including the step of executing a plurality of flow engines at each node used by the subscribers and observers, including a first flow engine for forwarding the biometric key of the subscriber and a plurality of second flow engines for forwarding biometric keys derived from biometric data associated with observers and exchanging biometric keys between the subscriber node and the plurality of the observer nodes.

3. The method of claim 1 further including the step of the flow engines comprise workflow engines that allocate tasks to the subscribers.

4. The method of claim 1 further including receiving a private biometric key from a card reader, wherein the private biometric key is derived from the subscriber's biometric data, wherein the subscriber is further authenticated based on a certificate that includes a public key derived from the private biometric key before the subscriber is allowed to sign the document.

5. The method of claim 1 further including using the biometric hash in a block of a blockchain associated with the subscriber, wherein the biometric hash is stored on a plurality of nodes, and authenticating the subscriber using a symmetric cryptography method that is based on using the biometric hash as a shared secrete in the symmetric cryptography method.

6. The method of claim 1 further including using the biometric hash in a block of a blockchain associated with the subscriber, wherein the biometric hash is stored on a plurality of nodes, and authenticating the subscriber using asymmetric cryptography that is based on using the biometric hash as a private key and a certificate that includes a public key derived from the biometric hash.

* * * * *